(12) United States Patent
Heemann et al.

(10) Patent No.: US 11,485,884 B2
(45) Date of Patent: *Nov. 1, 2022

(54) EXTRUDABLE PRESSURE SENSITIVE ADHESIVE BASED ON POLYBUTENE-1 POLYMER AND A STYRENE COPOLYMER SUITABLE FOR RECLOSABLE PACKAGINGS

(71) Applicant: HENKEL AG & CO. KGAA, Duesseldorf (DE)

(72) Inventors: Marcus Heemann, Neuss (DE); Thomas Scheeren, Heinsberg (DE); Dirk Kasper, Duesseldorf (DE); Andrea Queisser, Dormagen (DE)

(73) Assignee: HENKEL AG & CO., KGaA, Duesseldorf (DE)

( * ) Notice: Subject to any disclaimer, the term of this patent is extended or adjusted under 35 U.S.C. 154(b) by 432 days.

This patent is subject to a terminal disclaimer.

(21) Appl. No.: 16/411,434

(22) Filed: May 14, 2019

(65) Prior Publication Data

US 2019/0264075 A1    Aug. 29, 2019

Related U.S. Application Data

(63) Continuation of application No. PCT/EP2017/078880, filed on Nov. 10, 2017.

(30) Foreign Application Priority Data

Nov. 22, 2016 (EP) ..................... 16200045

(51) Int. Cl.
| | |
|---|---|
| *C09J 123/22* | (2006.01) |
| *C09J 123/20* | (2006.01) |
| *C09J 7/10* | (2018.01) |
| *C09J 5/00* | (2006.01) |
| *C09J 11/00* | (2006.01) |
| *B32B 7/12* | (2006.01) |
| *B32B 27/08* | (2006.01) |
| *B32B 27/32* | (2006.01) |
| *B32B 27/36* | (2006.01) |
| *C09J 7/38* | (2018.01) |

(52) U.S. Cl.
CPC ............... *C09J 123/22* (2013.01); *B32B 7/12* (2013.01); *B32B 27/08* (2013.01); *B32B 27/32* (2013.01); *B32B 27/36* (2013.01); *C09J 5/00* (2013.01); *C09J 7/10* (2018.01); *C09J 7/381* (2018.01); *C09J 123/20* (2013.01); *B32B 2553/00* (2013.01); *C09J 2423/00* (2013.01)

(58) Field of Classification Search
None
See application file for complete search history.

(56) References Cited

U.S. PATENT DOCUMENTS

| | | | |
|---|---|---|---|
| 4,077,893 A | 3/1978 | Kiovsky | |
| 4,116,917 A | 9/1978 | Eckert | |
| 4,141,847 A | 2/1979 | Kiovsky | |
| 4,427,834 A | 1/1984 | Martin | |
| 4,833,192 A * | 5/1989 | Lakshmanan | C09J 123/20 524/476 |
| 5,028,646 A * | 7/1991 | Miller | A61L 15/585 524/271 |
| 5,112,889 A | 5/1992 | Miller et al. | |
| 2003/0149417 A1* | 8/2003 | Kudo | A61F 13/5514 604/385.02 |
| 2011/0135922 A1* | 6/2011 | Joseph | C09J 193/04 428/355 AC |
| 2012/0321885 A1* | 12/2012 | Kido | C09J 7/29 428/352 |
| 2013/0202836 A1* | 8/2013 | Musacchi | C09J 7/38 428/41.3 |
| 2015/0065638 A1 | 3/2015 | LiPiShan et al. | |
| 2016/0222258 A1 | 8/2016 | Sustic et al. | |

FOREIGN PATENT DOCUMENTS

| | | |
|---|---|---|
| RU | 2208030 C2 | 7/2003 |
| WO | 2004046214 A2 | 6/2004 |
| WO | 2005108442 A1 | 11/2005 |
| WO | 2005113622 A2 | 12/2005 |
| WO | 2012052429 A1 | 4/2012 |

* cited by examiner

Primary Examiner — Sheeba Ahmed
(74) Attorney, Agent, or Firm — Sun Hee Lehmann

(57) ABSTRACT

The present invention relates to a pressure sensitive adhesive composition comprising: (i) at least one butene-1 (co)polymer; (ii) at least one liquid tackifier; (iii) at least one solid tackifier; (iv) at least one styrene copolymer; (v) optionally at least one further (co)polymer, different from (i) and (iv); (vi) optionally at least one additive. Furthermore, the use of the pressure sensitive adhesive composition according to the invention as closing mean for a packaging unit for foods, for packaging units to be heated in a microwave or oven, for a closing mean for packaging unit for drugs, hygienic tissues, cleaning tissues or cosmetic tissues. An article comprising the pressure sensitive adhesive composition according to the invention and a method of obtaining the article.

14 Claims, No Drawings

EXTRUDABLE PRESSURE SENSITIVE ADHESIVE BASED ON POLYBUTENE-1 POLYMER AND A STYRENE COPOLYMER SUITABLE FOR RECLOSABLE PACKAGINGS

FIELD OF THE INVENTION

The present invention relates to Pressure sensitive adhesives (in the following referred to as PSA) based on polybutene-1 (co)polymers and further comprising a liquid, a solid tackifier and a styrene copolymer, suitable for use in reclosable packaging, especially for the food industry. Furthermore, the present invention relates to the use of the pressure sensitive adhesive composition according to the invention as closing mean for a packaging unit for foods, for packaging units to be heated in a microwave or oven, for a closing mean for packaging unit for drugs, hygienic tissues, cleaning tissues or cosmetic tissues. Moreover, the present invention relates to an article comprising the adhesive according to the invention as an adhesive layer between two substrates and a method for manufacturing the article.

BACKGROUND OF THE INVENTION

The utilization of polybutene-1 (co)polymers in PSA has been generally disclosed in WO 2012/052429 A1. However, this reference only teaches the use of a single at room temperature solid tackifier. The thus obtained adhesives are suitable for reclosable packaging. However, their adhesion to substrates like PE or PET is mediocre in initial adhesion, adhesion after reclosing and viscosity which is important for the application of the adhesive in the manufacture step. Therefore, there is a need for PSAs based on polybutene-1 (co)polymers, which have improved adhesion properties, especially reclosability, as well as a sufficient viscosity and are suitable for reclosable packaging.

The inventors of the present invention have surprisingly found that the adhesion of PSA based on polybutene-1 (co)polymers can be improved and a sufficient viscosity can be reached if the PSA comprises two tackifiers. In particular a liquid and a solid tackifier. Moreover, it has been surprisingly found that the addition of a styrene copolymer leads to improved reclosability characteristics. Furthermore, it has been found that the PSA according to the invention show a high flexibility at cold temperatures, a good adhesion and good film forming characteristics while being excellent for extrusion forming.

DETAILED DESCRIPTION OF THE INVENTION

In the following the present invention is described in more detail. Each described embodiment may be combined with any other embodiment or embodiments unless explicitly stated otherwise. In particular, any feature indicated as being preferred or advantageous may be combined with any other feature or features indicated as being preferred or advantageous.

As used herein, the singular forms "a", "an" and "the" should be interpreted as "at least one".

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

Unless otherwise defined, all terms used in the specification, including technical and scientific terms, have the meaning as commonly understood by one of ordinary skill in the art.

The term "essentially free" within the context of this invention is to be interpreted as the respective compound is contained in the composition in an amount of less than 5 wt.-%, 4 wt.-%, 3 wt.-%, 2 wt.-%, 1.5 wt.-%, 1 wt.-%, 0.75 wt.-%, 0.5 wt.-%, 0.25 wt.-%, or 0.1 wt.-%, based on the total weight of the composition, wherein the amounts are respectively more preferred in descending order. For example, 4 wt.-% is more preferred than 5 wt.-% and 3 wt.-% is more preferred than 4 wt.-%.

The term "hydrogenated hydrocarbon resin" refers to hydrocarbon resins which are at least 95%, preferably at least 98%, more preferably at least 99%, most preferably fully hydrogenated.

The term "(co)polymer" includes homopolymers, copolymers, blockcopolymers, and terpolymers.

In particular, the present invention relates to:
1. A pressure sensitive adhesive composition comprising, preferably consisting of
    i) at least one butene-1 (co)polymer;
    ii) at least one liquid tackifier;
    iii) at least one solid tackifier;
    iv) at least one styrene copolymer;
    v) optionally at least one further (co)polymer, different from i) and iv);
    vi) optionally at least one additive.
2. The pressure sensitive adhesive composition according to item 1, wherein
    the at least one butene-1 (co)polymer having a butene-1 content of 85 to 100% by mol, based on the butene-1 (co)polymer;
    more preferably 85 to 99% by mol and wherein the co-monomer is selected from alpha-olefins, more preferably ethylene and/or propylene;
    and/or preferably the butene-1 (co)polymer has an melt index (measured according to DIN EN ISO 1133-1: 2012-03; 2.16 kg, 190° C./10 min) of at most 10, more preferably at most 5;
    and/or preferably the butene-1 (co)polymer has a distribution of molecular weights Mw/Mn (measured via GPC using polystyrene standards) of lower than 4;
    and/or preferably the butene-1 (co)polymer has an instrinsic viscosity (measured in tetraline at 135° C.) of from 1 to 4 dL/g, more preferably of from 1.5 to 2.5 dL/g;
    and/or preferably the butene-1 (co)polymer has a crystallinity of less than 40% (measured via X-ray), more preferably less than 30%, most preferably lower than 20%;
    and/or preferably the butene-1 (co)polymer has a density of 0.899 g/cm$^3$ or less, more preferably of 0.895 g/cm$^3$ or less, even more preferably lower than 0.875 g/cm$^3$;
    and/or preferably the butene-1 (co)polymer has a shore A hardness of lower than 90, more preferably lower than 70 (measured according to DIN EN ISO 868:2003-10).
3. The pressure sensitive adhesive composition according to item 2, wherein
    the at least one (at 25° C.) liquid tackifier has a viscosity of 15 to 40 Pa*s (measured with Brookfield Thermosel according to DIN 53019-1:2008-09 at 140° C.);
    preferably, the at least one liquid tackifier is a hydrocarbon resin;

more preferably a hydrogenated hydrocarbon resin;
most preferably the at least one liquid tackifier comprises a compound selected from pentaerythritol, glycerol ester, terpen-phenol resins, cyclopentadien resins or mixtures thereof;
and/or the at least one liquid tackifier has a softening point (measured according to ASTM E28-99) of 0 to 25° C.; more preferably 5 to 10° C.

4. The pressure sensitive adhesive composition according to any of items 1 to 3, wherein the
the at least one (at 25° C.) solid tackifier has a viscosity of 0.5 to 5 Pa*s (measured with Brookfield Thermosel according to DIN 53019-1:2008-09 at 140° C.);
preferably, the at least one solid tackifier is a hydrocarbon resin;
more preferably a hydrogenated hydrocarbon resin;
most preferably the at least one solid tackifier comprises a compound selected from aromatic modified resins, terpen phenol resins, piperylene, 2-methyl-2-butene copolymers, cyclopentadien resins or mixtures thereof;
and/or the at least one solid tackifier has a softening point (measured according to ASTM E28-99) of 80 to 150° C.; more preferably 85 to 130° C., most preferably 90 to 115° C.

5. The pressure sensitive adhesive composition according to item 4, wherein at least two solid tackifier having a viscosity of 0.5 to 5 Pa*s at 140° C. are comprised in the composition.

6. The pressure sensitive adhesive composition according to any one of items 1 to 5, wherein at least one further polymer, different from i) and iv) comprises an olefin (co)polymer, preferably an alpha-olefin (co)polymer; more preferably metallocene catalyzed alpha-olefin (co)polymers, even more preferably an ethylene or octane alpha-olefin (co)polymer; most preferably an octane ethylene alpha-olefin copolymer;
and/or wherein the at least one further (co)polymer has an melt index has an melt index (measured according to DIN EN ISO 1133-1:2012-03; 2.16 kg, 190° C./10 min) of at most 100, more preferably at most 20.

7. The pressure sensitive adhesive composition according to any of items 1 to 6, wherein the at least one additive comprises a compound selected from plasticizers, like polyisobutylene or oils; waxes, like paraffinic and microcrystalline waxes as well as their hydrogenated forms, fischer-tropsch-waxes; stabilizers, like UV-stabilizers; and modifying agents, like terpolymers of ethylene, acrylic acid esters and maleic anhydride, antioxidants, or mixtures thereof.

8. The pressure sensitive adhesive composition according to any of items 1 to 7, wherein the composition has a viscosity of from 300 to 2,000 Pa*s at 200° C.; more preferably 600 to 1600 Pa*s; most preferably 800 to 1500 Pa*s (measured with Brookfield Thermosel according to DIN 53019-1:2008-09 at 200° C.).

9. The pressure sensitive adhesive composition according to any of items 1 to 8, wherein the composition when employed as a 20 μm thick adhesive layer between two substrates, preferably the substrates are based on polyethylene (PE), polypropylene (PP), oriented polypropylene (OPP), polyethylene terephthalate (PET), amorphous polyethylene terephthalate (APET) and modified materials thereof, has an adhesion when releasing the two substrates from each other of 5 to 8 N/15 mm, preferably 6 N/15 mm and after again pressing the two substrates together of 0.5 to 2 N/15 mm, preferably 1 N/15 mm (measured according to DIN EN ISO 11339:2010-06).

10. The pressure sensitive adhesive composition according to any of items 1 to 9, wherein the styrene copolymer is a styrene block copolymer having a styrene content of 8 to 12 wt.-%, based on the total weight of the styrene copolymer and/or wherein the styrene copolymer is selected from Styrene-Butadiene-Styrene (SBS), Styrene-Ethylene-Propylene (SEP), Styrene-Isoprene-Styrene (SIS), Styrene-Ethylene/Butylene-Styrene (SEBS) and Styrene-Isoprene/Butadien-Styrene (SIBS) copolymers, more preferably these styrene copolymers are block copolymers, even more preferred a SIS block copolymer, most preferred a star shaped SIS block copolymer.

11. The pressure sensitive adhesive composition according to any one of items 1 to 10, wherein the composition comprises, preferably consists of:
35 to 74 wt.-%, preferably 40 to 60 wt.-% of i);
5 to 50 wt.-%, preferably 8 to 40 wt.-%, 9 to 20 wt-% more preferably of ii);
10 to 50 wt.-%, preferably 15 to 40 wt.-%, more preferably 20 to 35 wt.-% of iii);
3 to 40 wt.-%, preferably 5 to 30 wt.-%, more preferably 8 to 25 wt.-% of iv);
0 to 30 wt.-%, preferably 1 to 25 wt.-%, more preferably 5 to 20 wt.-% of v); and
0 to 30 wt.-%, preferably 0.1 to 20 wt.-%, more preferably 1 to 15 wt.-% of vi);
based on the total weight of the pressure sensitive adhesive composition.

12. Use of the pressure sensitive adhesive composition according to any of items 1 to 11 as closing mean for a packaging unit for foods, like cheese, sausage, meat, for packaging units to be heated in a microwave or oven, for a closing mean for packaging unit for drugs, hygienic tissues, cleaning tissues or cosmetic tissues.

13. An article comprising the composition of any one of items 1 to 11 as an adhesive layer between two substrates; preferably wherein the substrate material is independently selected from PE, low density polyethylene (LDPE), or PET substrates, more preferably wherein both substrates are PE, LDPE or PET substrates, most preferably wherein one substrate is PE and the other substrate is PET.

14. The article according to item 13, wherein the adhesive layer has a thickness of 5 to 30 μm, preferably 10 to 25 μm, more preferably 13 to 20 μm.

15. The article according to item 13 or 14, wherein the article is a packaging unit, preferably a food packaging unit, more preferably a reclosable packaging unit, most preferably a reclosable food packaging unit.

16. The article according to item 13 or 14, wherein the article is a packaging unit for drugs, hygienic tissues, cleaning tissues or cosmetic tissues, preferably a reclosable packaging unit for drugs, hygienic tissues, cleaning tissues or cosmetic tissues.

17. A method for manufacturing an article according to any one of items 13 to 16 comprising the following steps:
i) forming a film of the pressure sensitive adhesive composition according to any one of items 1 to 11 through a blow film head;
ii) bringing the formed film of step i) as middle layer in contact with two further layers.

The at least one butene-1 (co)polymer i) according to the present invention can for example be obtained by any one of the methods as disclosed in WO 2012/052429 A1. Commercially available butene-1 (co)polymers are available for example from Lyondell Basell under the tradename Koattro, like Koattro KT MR05. In embodiments, which comprise a copolymer or terpolymer, the content of butene-1 monomers is preferably at least 55%, more preferably at least 60%, most preferably at least 80%, based on the total monomer content of the respective polymer.

The at least one liquid tackifier ii) according to the present invention can be selected from liquid hydrocarbon resins and hydrogenated hydrocarbon resins, liquid polystyrenes, liquid rosin esters, liquid polyterpenes, liquid resins from polymerized and hydrogenated C9 hydrocarbon streams; liquid resins from polymerized and hydrogenated dicyclopentadiene species; liquid resins from polymerized and hydrogenated pure monomer species such as styrene, vinyl toluene, alpha-methyl styrene. The liquid tackifying resins include a liquid hydrocarbon resin comprising polymerized structures derived primarily from a stream of aliphatic petroleum derivatives, both dienes and mono-olefins, containing 4 to 6 carbon atoms. This polymerized product may optionally be further hydrogenated. Exemplary liquid tackifiers (having a Ring and Ball softening point below 25° C.) include polyterpenes such as Wingtack 10 commercially available from Sartomer, and Escorez 2520 commercially available from ExxonMobil Chemical.

Another useful liquid tackifier comprises predominantly cyclopentadiene species that have been polymerized and hydrogenated. Such a tackifying resin is commercially available from Exxon Chemical Company as ECR-327. Another liquid tackifying resin is a resin produced from the polymerization and hydrogenation of a pure monomer feedstock comprising styrene, vinyl toluene, and alpha-methyl styrene, such as the resin available from Eastmann Chemical Company as Regalrez 1018. Another useful liquid tackifying resin is a polymerized alpha-pinene resin having a softening point around 25° C. available from Arizona Chemical Company as Zonarez A-25.

In preferred embodiments the at least one liquid tackifier has a number average molecular weight of 150 to 1000 g/mol, preferably 250 to 950 g/mol, more preferably 300 to 900 g/mol measured via GPC employing polystyrene standards.

The at least one solid tackifier iii) according to the present invention can be selected from aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In a preferred embodiment, the at least one solid tackifier is non-polar, which indicates that the tackifier is substantially free of monomers having polar groups.

Preferred hydrocarbon resins for use as tackifiers or modifiers include:

Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyl-toluene, indene, methyl indene, etc.); cyclics (such as dicyclopentadiene, methyldicyclopentadiene, etc.); and or terpenes (such as limonene, carene, etc). In this paragraph C refers to carbon atoms. For example C5 means 5 carbon atoms.

Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene). The resins obtained after polymerization and separation of unreacted materials are preferably hydrogenated.

In a preferred embodiment the composition comprises at least two solid tackifiers. In a more preferred embodiment the first solid tackifier comprises a hydrogenated hydrocarbon resin and the second tackifier comprises a rosin.

The use of hydrogenated hydrocarbon resin as tackifier (solid as well as liquid) leads to an improved compatibility with the polymer i) of the present invention. In a further preferred embodiment, the tackifiers ii) and iii) are essentially free of aromatic modified tackifiers.

The at least one styrene copolymer can be any styrene copolymer known to the skilled person. Suitable styrene copolymers include thermoplastic elastomers. Illustrative examples of suitable materials are Styrene-Butadiene-Styrene (SBS), Styrene-Ethylene-Propylene (SEP), Styrene-Isoprene-Styrene (SIS), Styrene-Ethylene/Butylene-Styrene (SEBS) and Styrene-Isoprene/Butadien-Styrene (SIBS) copolymers, more preferably these styrene copolymers are block copolymers, even more preferred a SIS block copolymer, most preferred a star shaped SIS block copolymer. Such copolymers are for example commercially available under the general tradename "Kraton", e.g., Kraton D-1102, Kraton HT 1200 KT-N, by the Kraton Polymer Group. Terpolymers are suitable materials for the instant invention as well. One such terpolymer, marketed by the Kraton Polymer Group, is "Tacky G". This terpolymer is a SEBS block copolymer which has a grafted SI diblock on the backbone.

The styrene-butadiene and styrene-isoprene block copolymers can be linear copolymers corresponding to the general configuration A-B-A or A-B-A-B-A or radial copolymers corresponding to the general configuration (AB-)n wherein the polymer blocks A are non-elastomeric styrene-containing polymer blocks, and the polymer blocks B are elastomeric butadiene-containing or isoprene-containing polymer blocks. "n" is an integer of the repetitions of (AB-) blocks.

In one preferred embodiment of the present invention, the use of linear styrene-butadiene block copolymers is preferred. The styrene-butadiene block copolymer and styrene-isoprene block copolymer are individually comprised of at least about 25 weight percent, preferably from about 25 to about 50, and more preferably from about 35 to about 45, weight percent styrene. The styrene-butadiene block copolymer and the styrene-isoprene block copolymer each individually possess a melt flow index of from about 3 to about 50, preferably from about 8 to about 40 (as determined by ASTM-D 1238-95). The ratio of butadiene-isoprene block copolymer to styrene-isoprene block copolymer employed to produce the physical blend can broadly range from about 1:3 to about 3:1 parts by weight and preferably is about 1:1.

In another preferred embodiment of the present invention the styrene copolymer is a star shaped block copolymer, more preferred a star shaped SIS block copolymer. The styrene content of those copolymers is preferably 8 to 12 wt.-%, based on the total weight of the styrene copolymer. Exemplarily star shaped styrene copolymers and methods for their production are disclosed in U.S. Pat. Nos. 4,077, 893; 4,116,917; 4,141,847 and 4,427,834 that are herewith incorporated by reference.

The use of styrene copolymers leads to improved reclosability characteristics.

The optional at least one further polymer v), different from i) and iv) comprises an olefin (co)polymer. Exemplarily commercially available copolymers are sold under the tradenames Vistamaxx, Infuse, Affinity and Engage from Dow Chemical Company and ExxonMobil. Those olefin (co)polymers are well known to the skilled person in the field of hot melts. Exemplarily polymers and the process of their manufacture are described in WO 2005/108442 A1, WO 2005/113622 A1, WO 2004/046214, and US 20150065638 A1.

The PSA are obtained through commonly known kneader or extrusion processes. When using a blow extrusion-film technique it is favorable that the viscosity of the PSA is between 300 to 2,000 Pa*s at 200° C., more preferably 600 to 1,600 Pa*s at 200° C., most preferably 800 to 1500 Pa*s at 200° measured with Brookfield Thermosel according to DIN 53019-1:2008-09 at 200° C.

The material of substrates to be bonded are preferably PE (polyethylene), LDPE (low density polyethylene), PP (polypropylene), OPP (oriented polypropylene), PET (polyethylene terephthalate), APET (amorphous PET), CPET (crystalline PET). The materials can be modified, for examples containing an imprint.

EXAMPLES

Following Compounds were employed Koattro KT MR 05: Polybutene-1 copolymer from Lyondell Basell
LR 1: Liquid resin Regalite R1010 from Eastman, hydrogenated hydrocarbon resin
SR 1: Solid resin Regalite R 1090 from Eastman, hydrogenated hydrocarbon resin, Softening point 85 to 91° C. (Ring and Ball; measured according to ASTM E 28)
SR 2: Escorez 2203 from ExxonMobil, tackifying resin, softening point ~93° C. (Ring and Ball; measured according to ASTM E 28)
SCOP: Kraton HT 1200 KT, styrene-isoprene-styrene star shaped blockcopolymer Test method for reclosability: A PSA was respectively prepared for the below mentioned compositions. The compounds were refluxed for 6 as 15% solution in cyclohexane. The mixture was coated on PE with a coating knife (300 μm) and dried for 1 day at room temperature, followed by 1 hour at 90° C. The dried layer (thickness of dried layer about 20 μm) was adhered on PE and a 25 mm thick strip was rolled up. The adhesion was measured after 24 hours and the initial value was measured. Immediately after the measurement the strip was rolled up again (with a 1 kg roller) and the adhesion was measured. This step was repeated three times. The adhesion was measured according to DIN EN ISO 11339: 2010-06 (unit N/25 mm; measurement 300 mm/Min). The reclosability given in table 1 was assessed at the fourth step.

TABLE 1

Examples according to the present invention, all numbers refer to wt.-%, based on the total weight of the adhesive

| Compound | Ex. 1 | Comp Ex. 2 | Comp Ex. 3 |
|---|---|---|---|
| Koattro KT MR 05 | 40 | 60 | 60 |
| LR 1 | 9.5 | 9.5 | 9.5 |
| SR 1 | | 30.0 | |
| SR 2 | 30.0 | | 30.0 |
| SCOP | 20.0 | – | – |
| Stabilizer | 0.5 | 0.5 | 0.5 |
| Viscosity(200° C.) | ++ | ++ | + |
| Reclosability | ++ | ○ | + |

Results are given from – – (bad),
– (not sufficient),
○ (acceptable),
+ (good),
++ (very good)

Example 1 according to the present invention shows very good viscosity while having very good reclosability properties. In contrast, the comparative examples only have acceptable or good reclosability properties.

The invention claimed is:

1. A pressure sensitive adhesive composition comprising,
   i) at least one butene-1 (co)polymer having a butene content of 85-100 mol % and 0-15 mol % of ethylene or propylene comonomer;
   ii) at least one liquid tackifier;
   iii) at least one solid tackifier;
   iv) at least one styrene copolymer;
   v) optionally at least one further (co)polymer, different from i) and iv); and
   vi) optionally at least one additive;
   wherein the liquid tackifier and the solid tackifier are essentially free of aromatic modified tackifier
   wherein the pressure sensitive adhesive is characterized by having a reclosable adhesion value of 5 to 8 N/15 μm when employed as 20 μm thick in accordance to DIN EN ISO 11339:2010-06.

2. The pressure sensitive adhesive composition according to claim 1, wherein the at least one liquid (at 25° C.) tackifier ii) has a viscosity of 15 to 40 Pa*s at 140° C.

3. The pressure sensitive adhesive composition according to claim 1, wherein the at least one solid (at 25° C.) tackifier iii) has a viscosity of 0.5 to 5 Pa*s at 140° C.

4. The pressure sensitive adhesive composition according to claim 3, further comprising a second solid tackifier in component iii) and wherein the two solid tackifiers iii) have a combined viscosity of 0.5 to 5 Pa*s at 140° C.

5. The pressure sensitive adhesive composition according to claim 1, wherein at least one further polymer v) is selected from the group consisting of metallocene catalyzed ethylene alpha-olefin, metallocene catalyzed octane alpha-olefin, and octane ethylene alpha-olefin copolymer.

6. The pressure sensitive adhesive composition according to claim 1, wherein the at least one additive (vi) comprises plasticizers; waxes; stabilizers; modifying agents; antioxidants or mixtures thereof.

7. The pressure sensitive adhesive composition according to claim 1, wherein the composition has a viscosity of from 300 to 2,000 Pa*s at 200° C.

8. The pressure sensitive adhesive composition according to claim 1, wherein the composition when employed as a 20 μm thick adhesive layer between two substrates has an adhesion when releasing the two substrates from each other of 5 to 8 N/15 mm and after again pressing the two substrates together of 0.5 to 2 N/15 mm.

9. The pressure sensitive adhesive composition according to claim 1, wherein the composition comprises:
   35 to 74 wt.-%, of i);
   5 to 50 wt.-% of ii);
   10 to 50 wt.-% of iii);
   3 to 40 wt.-% of iv);
   0 to 30 wt.-% of v); and
   0 to 30 wt.-% of vi);
   based on the total weight of the pressure sensitive adhesive composition.

10. The pressure sensitive adhesive composition according to claim 1 which is a recloseable packaging adhesive for foods, drugs, hygienic tissues, cleaning tissues or cosmetic tissues.

11. An article comprising the composition of claim 1 as a recloseable adhesive layer between two substrates.

12. The article according to claim 11, wherein the article is a recloseable packaging unit.

13. The article according to claim 11, wherein the article is a recloseable packaging unit for drugs, hygienic tissues, cleaning tissues or cosmetic tissues.

14. The pressure sensitive adhesive composition according to claim 1, wherein the at least one butene-1 (co)polymer having a butene-1 content of 85 to 100% by mol, based on the butene-1 (co)polymer.

* * * * *